H. L. HARTBURG.
ADJUSTABLE INTERLOCKING CLAMP.
APPLICATION FILED SEPT. 28, 1917.

1,302,544.

Patented May 6, 1919.
2 SHEETS—SHEET 1.

Witness:
Inventor:
Herman L. Hartburg

H. L. HARTBURG.
ADJUSTABLE INTERLOCKING CLAMP.
APPLICATION FILED SEPT. 28, 1917.
1,302,544.
Patented May 6, 1919.
2 SHEETS—SHEET 2.
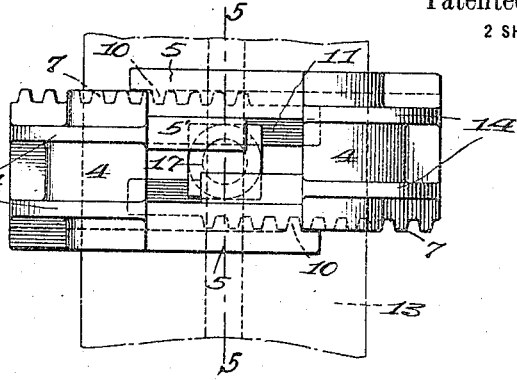
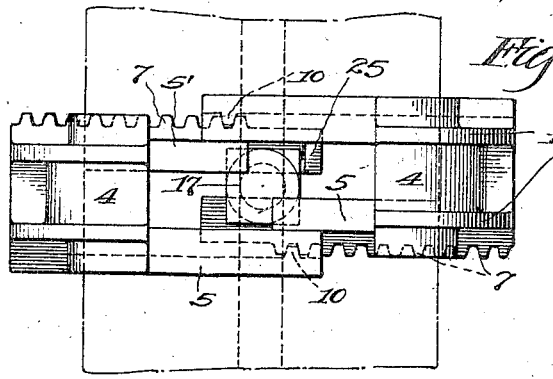
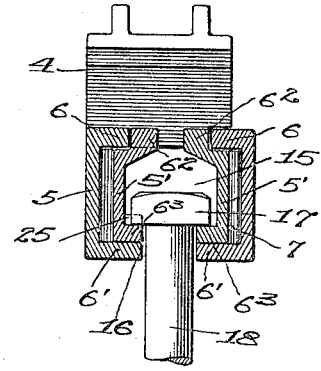
Inventor:
Herman L. Hartburg

UNITED STATES PATENT OFFICE.

HERMAN L. HARTBURG, OF DENVER, COLORADO.

ADJUSTABLE INTERLOCKING CLAMP.

1,302,544.           Specification of Letters Patent.        Patented May 6, 1919.

Application filed September 28, 1917. Serial No. 193,698.

*To all whom it may concern:*

Be it known that I, HERMAN L. HARTBURG, a citizen of the United States, and a resident of Denver, county of Denver, and State of Colorado, have invented a certain new, useful, and Improved Adjustable Interlocking Clamp, of which the following is a specification.

My invention relates generally to means for suspending pipes, shafts and other devices from beams and other supports, and relates more particularly to adjustable means for that purpose.

The general object of my invention is to provide clamping means for supporting pipes, shafts and other devices which shall be easily adjustable to embrace supporting means of widely different sizes and character.

Other objects of my invention are to provide an adjustable clamp which shall be of simple and durable construction; which can be manufactured at low cost; which can be made of associated identical parts; and which can be securely locked together by a standard bolt that may be used for the suspension of the pipe or shaft of the device as well.

I am aware that it has been proposed heretofore to make adjustable clamps, but such clamps have been and are objectionable in that they are adapted to be secured to only a very limited range of beam size; or comprise a multiplicity of parts some of which are easily lost, thus destroying the utility of the structure; such prior devices are often expensive to manufacture and require considerable time to assemble, or require special bolts and hooks of different kinds.

My invention consists generally in the form, arrangement, construction and coöperation of parts whereby the above named objects, together with others which will appear hereinafter, are attainable.

My invention will be more readily understood by reference to the accompanying drawings, which illustrate that form which I have thus far found to be the best.

In said drawings:

Fig. 3 is a top plan view of the device illustrating the relation to the parts of a beam by means of dot-and-dash lines;

Fig. 4 is a view similar to Fig. 3, but illustrating the devices embracing a wider beam;

Fig. 5 is a cross-section substantially on the line 5—5 of Fig. 3;

Fig. 6 is a perspective view of a modified form of my invention adapted particularly to attachment to channel members; and Fig. 7 is an end view, on a reduced scale, showing the relation of the clamp parts and bolt of that form of my invention shown in Fig. 6.

My device comprises generally two telescoping parts or units in one form of which the units are identical, having a hook-like end for engagement with the parts of the supporting beam. These units may be moved to and from each other through a wide range as may be necessary to embrace many sizes of beams. Having positioned the units properly, I lock them against undesired movement by means of an ordinary bolt the head of which engages the clamp units and the shank of which may be connected to means embracing the pipe, shaft, or other device to be supported.

When it is necessary to embrace a non-symmetrical beam, such, for example, as the base of a channel member, I remove one of the identical clamp parts or units and substitute a clamp unit of special and different form, as will be seen when I describe the embodiment of my invention in detail.

Figure 1:
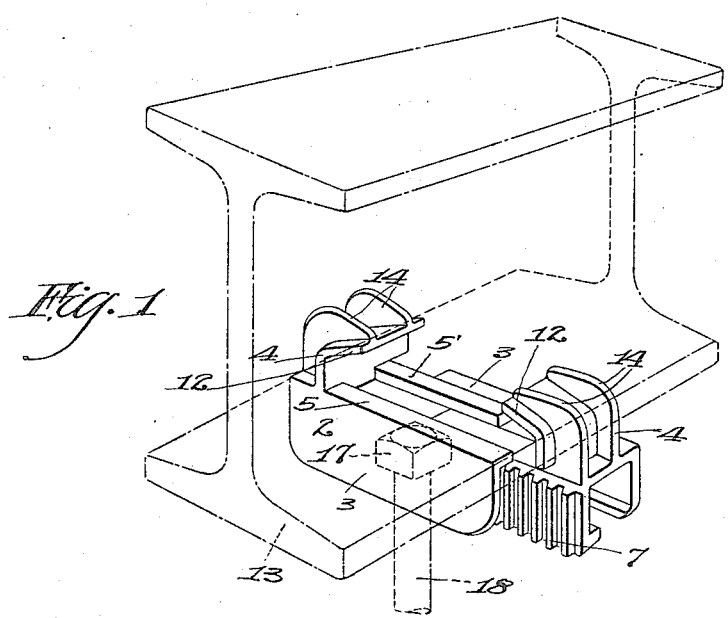
Figure 1 is a perspective view of a device embodying my invention illustrated in its relation to an I-beam by means of dot-and-dash lines.
Figure 2:
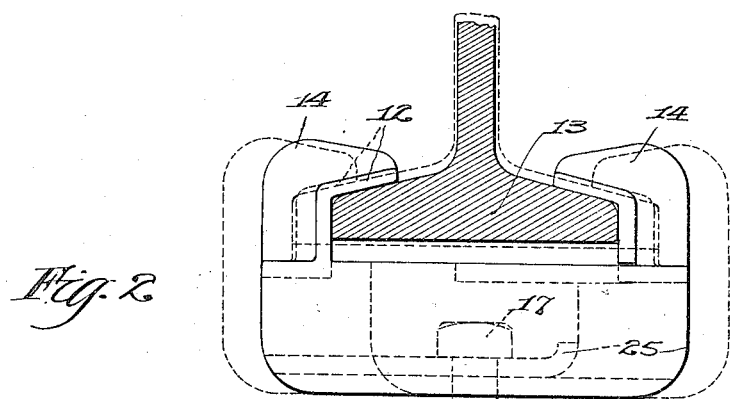
Fig. 2 is a view showing my adjustable clamp secured to the base of a beam together with means supporting a pipe.

I have devised an extremely durable and effective means for accomplishing the desired ends. Referring now to the drawings for the details of construction, 2 represents one of two identical clamp units composed of the body portion, 3, and an upstanding hook-like end portion, 4. The body portion, 3, comprises parallel vertical side portions, 5—5', and an integral angularly disposed upper and lower portions, 6—6', $6^2$—$6^3$, thus being channel-shaped in cross section. On the outer face of the side portion, 5, I form a plurality of teeth-like projections, 7, and upon the inner face of the side portion, 5, I provide a single tooth-like projection, 10. The upper angular portion, $6^2$, is offset with respect to the vertical side portion, 5', to accommodate the angular portion, 6, of another identical clamp unit, as is well shown in Fig. 5. The overhanging or angular portion, 6², is also cut away as indicated at 11, so that the parts may telescope into a very small compass without having the portion, 6², engaging the hook-like end portion of the clamp unit. The end-hook-like portion, 4 comprises a beam-engaging portion, 12, which is preferably inclined upwardly and inwardly so that it may properly embrace the base, 13, of a beam, as is well shown in Figs. 1 and 2. I brace the beam-engaging portion, 12, by means of vertical ribs, 14, which rise from the body of the clamp member. In assembling the device, one clamp member is merely reversed and inserted partly within and partly without the other member as is well shown in the drawings. When in this position the teeth-like projections, 7, on the outer part of each clamp, engage the single tooth-like projections, 10, on the inner face of the other member. The parts obviously may be moved to and from each other when the teeth are disengaged. Thus, as is illustrated in Fig. 3, they are moved so that the hook-like end portions are relatively close together and in Fig. 4 they are moved farther apart to embrace a wider beam. It is necessary that the members when placed in desired position be locked in that position against undesired movement and this I accomplish in a very simple manner. It will be noted that when the parts are assembled a channel-like space, 15, shown in Fig. 5 is formed between the opposite portions, 5', of the respective clamp units, and that access may be had thereto by means of the slot, 16, in the bottom of the clamp. I am thus enabled to place in the space, 15, the head, 17, of a bolt, 18, by starting the bolt in from the end of the slot, 16. I move the bolt inwardly until it occupies substantially a central position between the ends of the respective clamp units. The bolt head, 17, is of a size substantially equal to the width of the space, 15, being just enough smaller to permit its free insertion. As it is necessary in assembling parts to move the side walls, 5', 5', of the respective clamps toward each other so that the teeth, 7, may be freed of the engaging tooth, 10, such movement is prevented when the bolt head, 17, is in place as the very slight movement which is permitted by the bolt-head, 10, is not sufficient to permit the teeth to become disengaged. The bolt, 18, may be an ordinary stock bolt, having a screw threaded end, 19, as illustrated in Fig. 2. In Fig. 2 I have illustrated one means of suspending a pipe, 20, which consists in providing a split band, 21, embracing the pipe, and having a hole, 22, through which the screw threaded end, 19, of the bolt projects. The load is carried by means of a nut, 23, threaded upon the bolt end, 19, under the upper portion, 24, of the pipe-engaging band, 21. An upstanding projection, 25, at the end of the bottom portion, 6³, of the clamp unit prevents the head of the bolt from sliding out of clamp when the parts are in position and the load is carried thereby.

The construction thus far described is adapted particularly for use with beams having a symmetrical base, such for example as the I-beam illustrated, but my invention is not limited to use with such beams, as I may embrace beams having a non-symmetrical base, as, for example, the base of a channel member. I have illustrated in Fig. 6 a modification of my invention adapted for use with such beams. In this instance instead of using two identical units I use one unit, which is the same as those already described, and bears similar reference characters. The other part or unit corresponds in its body portion to the clamp units already described, and I have applied similar reference characters thereto. It differs, however, in the form of the beam-engaging portion, 30, which instead of having an inwardly projecting hook end has a flat vertical face portion, 31, upstanding from the body of the clamp member for engagement with the adjacent flat vertical face of the channel member as illustrated in Fig. 6, and the face portion, 31, is rigidly braced by means of ribs, 32. The parts or units may be locked together in the same manner by means of a bolt and bolt-head. It may be desirable, if the beam is subjected to considerable vibration, to provide a set screw, 33, which may be powerfully braced against the side face of the channel member. When using the device of the form shown in Fig. 6, I prefer to keep the bolt head fairly well toward that clamp having the hooked end so that as little of the load as is possible is carried upon the member, 30, and to this end I prefer to provide a stop, 35, to prevent the bolt from being placed in a position to impose severe strains on the unit 30 (see Fig. 7).

From this detailed description it is thought that the objects and purposes of my invention and its advantages will be understood by those skilled in the art to which this appertains, but inasmuch as this disclosure will readily suggest to others modified structures whereby the substantial objects and purposes of my invention may be attained, I do not wish to be limited to the specific construction herein shown and described, except only as may be necessary by limitation in the hereunto appended claims.

I claim:

1. In a device of the class described, a clamp unit, comprising a body portion and a beam-engaging end portion, said body portion comprising spaced side walls, and upper and lower angularly projecting portions, one of said angularly projecting portions being off-set with respect to its side wall to permit intimate sliding relation of a coacting clamp unit.

2. In a device of the class described a clamp unit, comprising a body portion and a beam-engaging end portion, said body portion comprising spaced side walls, and upper and lower angularly projecting portions, one of said angularly projecting portions being off-set with respect to its side wall to permit intimate sliding relation of a co-acting clamp unit and said beam-engaging portion being undercut to permit movement thereunder of the end portion of an identical unit.

3. In a device of the class described, a clamp unit, comprising a body portion and a beam-engaging end portion, said body portion comprising spaced side walls and upper and lower angularly projecting portions, one of said angularly projecting portions being off-set with respect to its side wall to permit intimate sliding relation of a co-acting clamp unit, a plurality of teeth-like projections on one of said side walls, and at least one tooth-like projection on the other side wall.

4. In a device of the class described, a clamp unit comprising a body portion and a beam-engaging end portion, said body portion comprising spaced side walls, and upper and lower angularly projecting portions, one of said angularly projecting portions being off-set with respect to its side wall to permit intimate sliding relation of a co-acting clamp unit, a plurality of teeth-like projections on the outer face of one side wall, and at least one tooth-like projection on the inner face of the other side wall.

5. In a device of the class described, a clamp unit comprising a body portion and a beam-engaging end portion, said body portion comprising spaced side walls, and upper and lower angularly projecting portions, one of said angularly projecting portions being off-set with respect to its side wall to permit intimate sliding relation of a coacting clamp unit, and one of said side walls being of a lesser height than the other.

6. In a device of the class described, a clamp unit comprising a body portion and a beam-engaging end portion, said body portion comprising spaced side walls, and upper and lower angularly projecting portions, one of said angularly projecting portions being off-set with respect to its side walls to permit intimate sliding relation of a co-acting clamp unit, one of said angularly projecting portions having an upstanding stop portion.

7. In a device of the class described, a clamp unit comprising a body portion and a hook-like beam-engaging end portion, said body portion comprising spaced side walls, and upper and lower angularly projecting portions, one of said angularly projecting portions being off-set with respect to its side wall to permit intimate sliding relation of an identical clamp unit.

In testimony whereof, I have hereunto set my hand this 12th day of September, 1917.

HERMAN L. HARTBURG.

Copies of this patent may be obtained for five cents each, by addressing the "Commissioner of Patents, Washington, D. C."